United States Patent [19]

Noizet

[11] Patent Number: 4,608,892

[45] Date of Patent: Sep. 2, 1986

[54] BAND SAW FOR FOODSTUFFS

[75] Inventor: Erwin Noizet, Frickenhausen, Fed. Rep. of Germany

[73] Assignee: REICH Spezialmaschinen GmbH, Nuertingen, Fed. Rep. of Germany

[21] Appl. No.: 658,747

[22] Filed: Oct. 9, 1984

[30] Foreign Application Priority Data

Oct. 21, 1983 [DE] Fed. Rep. of Germany ....... 3338282

[51] Int. Cl.[4] .......................... B26D 1/46; B26D 7/08; A22B 5/20; A22C 17/00
[52] U.S. Cl. ......................................... 83/168; 83/788; 83/859
[58] Field of Search .................... 83/168, 788, 859; 134/177

[56] References Cited

U.S. PATENT DOCUMENTS

| 1,908,727 | 5/1933 | Bleam | 83/168 |
| 1,916,596 | 7/1933 | Winfree | 83/168 |
| 2,238,849 | 4/1941 | Kastberg | 134/177 X |
| 2,673,761 | 3/1954 | Karlstrom | 134/177 X |
| 4,214,345 | 7/1980 | Duncan et al. | 83/168 X |

Primary Examiner—Donald R. Schran
Attorney, Agent, or Firm—W. G. Fasse; D. H. Kane, Jr.

[57] ABSTRACT

A band saw for foodstuffs, especially meat and bones, has a housing with a door and spray nozzles operatively arranged inside said housing for spraying a cleaning liquid or drying air onto all saw components inside said housing. Thus, a complete and thorough cleaning and drying of all saw surfaces inside said housing is possible without any appreciable extra effor or man hours. Simultaneously, the environment of the saw is protected against soiling or wetting by the cleaning operation for the saw.

8 Claims, 2 Drawing Figures

BAND SAW FOR FOODSTUFFS

FIELD OF THE INVENTION

The invention relates to a band saw for foodstuffs, especially meat and bones, having a housing closable by a door wherein the guide and drive wheel for a band saw blade are arranged and driven by a motor such as an electromotor.

DESCRIPTION OF THE PRIOR ART

Band saws for foodstuffs, especially meat and bones require doors to provide an easy access for the manual cleaning with the aid of spray hoses to assure a thorough cleaning after each use. Such cleaning operations are labor intensive. Since an operator must handle the hose and water spray and frequently manual cleaning with the aid of brushes is necessary in addition to the spraying operation. Even with substantial efforts it is not always assured that all internal surfaces of the saw are thoroughly cleaned. Moreover, it is almost unavoidable that water and contaminating substances resulting from the cleaning also soil the environment because the spary and reflected spray will reach adjacent machinery and the like.

OBJECTS OF THE INVENTION

In view of the above it is the aim of the invention to achieve the following objects singly or in combination:
to improve a band saw for food stuffs in such a way that all saw surfaces inside the housing can be rapidly and thoroughly cleaned without the use of manual labor;
to avoid soiling the environment of such a band saw by spent cleaning liquid; and
to also improve the drying of the internal components after a cleaning operation.

SUMMARY OF THE INVENTION

According to the invention cleaning spray nozzles are operatively arranged inside the saw housing for spraying a cleaning liquid onto all surfaces of the saw inside the housing while the door or doors are closed. The cleaning spray nozzles are interconnected by liquid supply conduits which in turn are connected to a cleaning liquid supply inlet connector which may additionally be used to supply drying air to the same nozzles if desired. It has been found that by this arrangement of cleaning nozzles inside the housing a complete and effective cleaning of all internal surfaces of the saw is possible without using labor, except for the disconnection and connection of the cleaning liquid and/or air supply means. Simultaneously, soiling of the environment is also avoided.

It is also possible to arrange the cleaning nozzles in a movable manner, for example, in the form of spray propellers, whereby distribution of cleaning liquid is advantageously even more intensive. Preferably, the spray propellers are arranged in the vicinity of the guide and drive wheels for the saw band to assure a thorough cleaning of these surface areas while the remaining spray nozzles are stationary, but so arranged that all surface areas are effectively reached inside the saw housing. Preferably, and advantageously the spray propellers are rotatably mounted in the door opposite the guide and drive wheels for freely rotating these spray propellers by the sprays exiting from the nozzles under the pressure which supplies the cleaning liquid into these nozzles.

The cleaning effect can be reinforced by arranging at the inlet connector a chamber for holding a quantity of detergent, for example, a soap bar or the like. This detergent is so arranged that the inflowing water gradually dissolves the detergent and entrains solved detergent for the cleaning purpose. Preferably, the cleaning liquid supply hose or the like is coupled to the inlet connector by a so-called rapid coupling device of conventional construction. Such a feature also facilitates the connection of a drying air supply hose to the inlet connector.

If desired, a collecting container for the spent cleaning liquid is advantageously arranged below the housing of the saw to receive the spent liquid through a drainage opening in the bottom of the saw housing.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
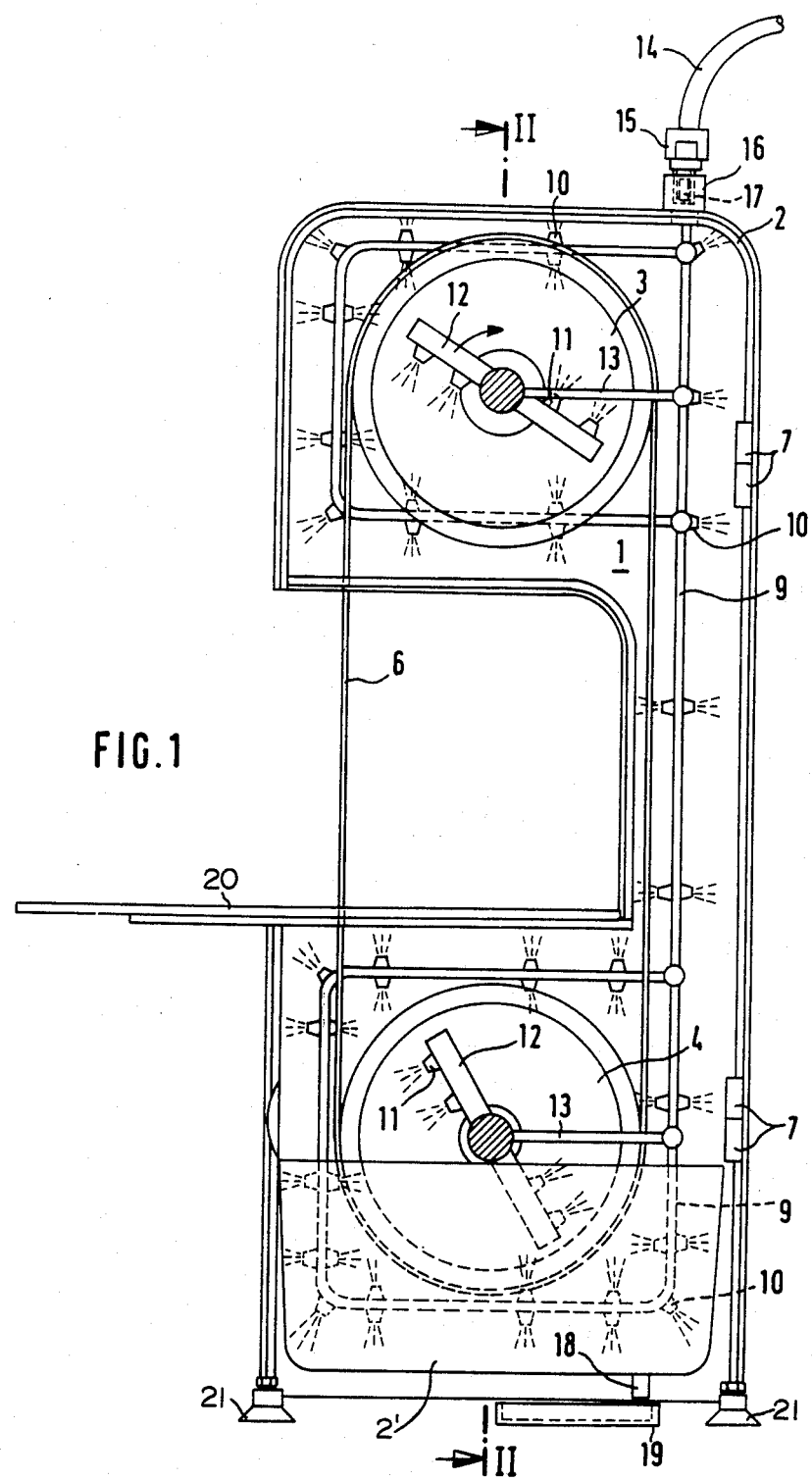
FIG. 1 shows a front view of the band saw according to the invention with the door removed.
Figure 2:
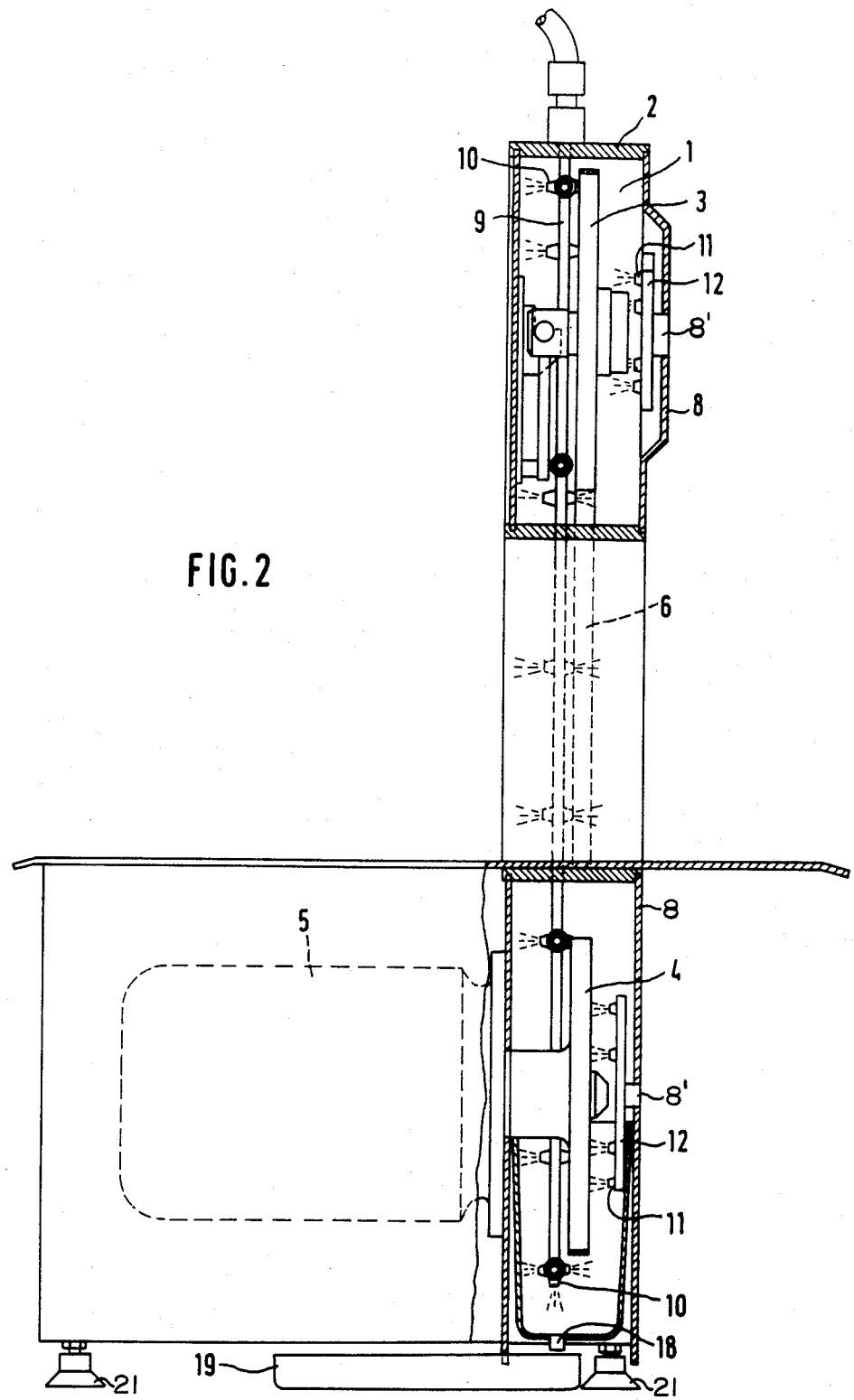
FIG. 2 is a sectional view along section line II—II in FIG. 1.

As shown in FIGS. 1 and 2, the inner space 1 in the housing 2 of the band saw can be closed by a door 8 hinged to the housing by hinges 7. A guide roller 3 for the saw blade 6 is conventionally mounted in an upper portion of the inner space 1 in the housing 2. A drive roller 4 is similarly mounted for rotation by a motor 5 in a lower portion of the housing. A saw table 20 is conventionally provided between the upper and lower housing portions. The operation of the saw blade 6 guided by the guide wheel 3 and driven by the drive wheel 4 is conventional.

The hinged door 8 is so constructed that the entire inner space 1 in the housing 2 is easily accessible for maintenance purposes.

According to the invention a conduit system 9 of flexible or rigid conduits is operatively arranged inside the housing 2. Cleaning nozzles 10 are secured to the conduits 9 in all locations required for reaching all internal saw surfaces for the cleaning operation. As shown in the drawings, some nozzles 10 are directed toward the wheels 3, 4 and thus toward the saw blade 6, while other nozzles 10 are simultaneously directed in opposite directions toward the inner surfaces of the walls forming the housing 2. Additional cleaning nozzles 11 are operatively mounted on rotational spraying propellers 12. Preferably, these propellers 12 are mounted in bearings 8' operatively secured to the respective door sections of the door 8 and in such positions that the respective spray nozzles 11 face the guide wheel 3 or the drive wheel 4. The supply of cleaning liquid or drying air to the nozzles 11 on the propellers 12 is accomplished through flexible hose sections 13 so that the door 8 may be opened without any problems.

The cleaning liquid, preferably water, is supplied into the conduit system 9, 13 through a supply conduit or hose 14 connected through a rapid coupling device 15 of conventional construction. An inlet connector 16 constructed for cooperation with the rapid coupling device 15 leads into the housing 2 and is connected to the conduit system 9. Preferably, the inlet connector 16 is provided with a chamber 17 for holding a supply of detergent, for example, in the form of a soap bar or the like.

A discharge plug or the like 18 is located in the bottom portion 2' of the housing 2 at the lowest point thereof for discharging spent cleaning liquid and any soiling matter in the cleaning liquid into a collecting container 19. Feet 21, preferably of the conventional adjustable type, are secured to the four corners of the saw housing 2.

The conduit system 9 is preferably located inside the housing 2. However, it is quite possible to secure at least certain of the nozzles 10 to and through the housing walls and to connect a conduit system on the outside of the housing 2 to these nozzles.

The chamber 17 could be provided with a by-pass so that a washing cycle with detergent could be followed by a rinsing cycle without detergent.

Although the invention has been described with reference to specific example embodiments, it will be appreciated, that it is intended, to cover all modifications and equivalents within the scope of the appended claims.

What is claimed is:

1. In a band saw for foodstuffs, especially meat and bones, having a housing, door means for closing said housing, a guide wheel operatively mounted in said housing for guiding a band saw blade, a positively driven drive wheel operatively mounted in said housing for driving said band saw blade, the improvement comprising cleaning nozzle means operatively mounted inside said housing, conduit means operatively connected to said cleaning nozzle means for supplying a cleaning liquid to said cleaning nozzle means, means connecting one group of nozzle means to said conduit means for directing cleaning liquid jets toward said band saw blade, toward said guide wheel, and toward said drive wheel, and means mounting another group of nozzle means to said conduit means for directing cleaning liquid jets toward inner surfaces of said housing for cleaning said band saw, said guide and drive wheels and said inner surfaces inside said housing.

2. The band saw of claim 1, further comprising conduit connector means leading into said housing, said conduit means being connected to said connector means for supplying a cleaning or drying medium to said conduit means arranged inside said housing.

3. The band saw of claim 1, further comprising mounting means for movably mounting at least certain of said cleaning nozzle means in a movable manner.

4. The band saw of claim 3, wherein said mounting means comprise bearing means for rotatably supporting said cleaning nozzle means.

5. The band saw of claim 4, wherein said mounting means for said cleaning nozzle means comprise rotatable propellers, said cleaning nozzle means being operatively secured to said propellers.

6. The band saw of claim 5, wherein said mounting means are arranged in said door means in such positions that said rotatable propellers face said guide wheel and said drive wheel.

7. The band saw of claim 1, further comprising an opening in said housing at a lowest point in a housing bottom and drainage collecting means arranged below said opening for receiving spent cleaning liquid.

8. The band saw of claim 1, further comprising detergent supply means operatively connected to said conduit means for releasing detergent into a liquid cleaning medium.

* * * * *